(12) United States Patent
Schaefer et al.

(10) Patent No.: US 8,950,371 B2
(45) Date of Patent: Feb. 10, 2015

(54) THREE-SHAFT TRANSMISSION HAVING AN ELASTIC COUPLING ELEMENT

(75) Inventors: Jens Schaefer, Herzogenaurach (DE); Mike Kohrs, Oberreichenbach (DE); Jeffrey S. Balko, Herzogenaurach (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 0 days.

(21) Appl. No.: 13/981,656

(22) PCT Filed: Dec. 22, 2011

(86) PCT No.: PCT/EP2011/073780
§ 371 (c)(1),
(2), (4) Date: Jul. 25, 2013

(87) PCT Pub. No.: WO2012/110149
PCT Pub. Date: Aug. 23, 2012

(65) Prior Publication Data
US 2014/0007830 A1    Jan. 9, 2014

(30) Foreign Application Priority Data
Feb. 14, 2011    (DE) .................... 10 2011 004 069

(51) Int. Cl.
*F01L 1/34*    (2006.01)
*F01L 1/344*    (2006.01)
*F01L 1/352*    (2006.01)

(52) U.S. Cl.
CPC ............... *F01L 1/344* (2013.01); *F01L 1/352* (2013.01); *F01L 2001/34476* (2013.01); *F01L 2001/34483* (2013.01)

USPC ............ 123/90.17; 123/90.15; 464/160

(58) Field of Classification Search
USPC .................... 123/90.15, 90.17; 464/160
See application file for complete search history.

(56) References Cited

U.S. PATENT DOCUMENTS

| 7,308,876 | B2 | 12/2007 | Schafer et al. | |
|---|---|---|---|---|
| 7,673,598 | B2 | 3/2010 | Schaefer et al. | |
| 7,703,425 | B2 * | 4/2010 | Schafer et al. | 123/90.17 |
| 8,141,526 | B2 | 3/2012 | Kohrs et al. | |
| 2003/0226534 | A1 | 12/2003 | Watanabe et al. | |
| 2005/0274339 | A1 | 12/2005 | Stork et al. | |
| 2007/0051332 | A1 | 3/2007 | Uehama et al. | |
| 2007/0199531 | A1 | 8/2007 | Sugiura et al. | |
| 2009/0121671 | A1 | 5/2009 | Uehama et al. | |
| 2009/0199801 | A1 | 8/2009 | Imai et al. | |
| 2010/0288216 | A1 | 11/2010 | Takahashi et al. | |

FOREIGN PATENT DOCUMENTS

| DE | 10248351 | 4/2004 |
|---|---|---|
| DE | 102004009128 | 9/2005 |
| DE | 102004038681 | 6/2006 |
| DE | 102005059884 | 7/2007 |

(Continued)

*Primary Examiner* — Ching Chang
(74) *Attorney, Agent, or Firm* — Volpe and Koenig, P.C.

(57) ABSTRACT

A triple shaft adjusting gear including a driving part (01) that can be connected rotationally fast to a drive shaft, a driven part that can be connected rotationally fast to a driven shaft and an adjusting member that can be connected to an adjusting shaft. A mechanical stop for limiting an adjusting angle between the drive shaft and the driven shaft is arranged between two of the three shafts. According to the invention, the stop is an elastic coupling member for damping an impingement in case of a stop.

11 Claims, 3 Drawing Sheets

(56) References Cited

FOREIGN PATENT DOCUMENTS

| | | |
|---|---|---|
| DE | 102008043689 | 5/2009 |
| DE | 102009000690 | 8/2009 |
| DE | 102008039008 | 2/2010 |
| EP | 1607589 | 12/2005 |
| EP | 2006501 | 12/2008 |
| EP | 2463485 | 6/2012 |
| JP | 2000130117 | 5/2000 |
| WO | 2005080757 | 9/2005 |
| WO | 2006018080 | 2/2006 |

* cited by examiner

THREE-SHAFT TRANSMISSION HAVING AN ELASTIC COUPLING ELEMENT

BACKGROUND

The invention concerns a triple shaft adjusting gear comprising a driving part that can be connected rotationally fast to a drive shaft, a driven part that can be connected rotationally fast to a driven shaft and an adjusting member that can be connected rotationally fast to an adjusting shaft.

Triple shaft adjusting gears are used for instance in internal combustion engines for adjusting phase angles, predominantly for adjusting the opening and closing times of the gas exchange valves (camshaft adjusters, phase adjusters for actuator shafts in variable valve trains). The phase adjuster is arranged as an adjusting member in a triple shaft system. Primarily, the driving power is supplied to the triple shaft system through the drive shaft (e.g. chain sprocket), and this driving power is then delivered through the driven shaft (e.g. camshaft). The adjusting member is arranged within the power flow as a connecting member between the drive shaft and the shaft to be driven. The adjusting member, superimposed by a third shaft (adjusting shaft), enables an additional transfer of mechanical power into the shaft system or a withdrawal of this power out of the system. In this way, it is possible to vary the moving function (phase angle) defined by the drive shaft relative to the driven shaft.

Examples of such triple shaft adjusting gears are wobble plate mechanisms and internal eccentric mechanisms which are described, for instance in WO 2006/018080. This category further includes the shaft mechanisms disclosed in WO 2005/080757 and the mechanisms known from US 2007/0051332 A1 and US2003/0226534 A1.

A variety of phase adjusters are known from the prior art. For example, DE 10 2004 009 128 A1, DE 10 2005 059884 A1 and DE 10 2004 038 681 A1 describe electromechanical camshaft adjusters.

DE 102 48 351 A1 discloses an electromechanical camshaft adjuster in which the adjusting motor is connected to the adjusting gear through a disengageable clutch. Through an adequate design of the clutch, it is possible to limit the torque that can be transmitted to the adjusting shaft. This clutch then acts as a safety clutch.

A special case of a triple shaft adjusting gear is a double shaft arrangement in adjusting drives in which the drive shaft is fixed to the housing, i.e. power is transmitted only between the adjusting shaft and the driven shaft. A device of this type serves to convert a driving power of an adjusting element delivered at a high speed and low load into an output power at a low speed and high load, and is used, for instance in reducing gear devices for adjusting drives in the automotive field as well as in industrial application e.g. robotics.

In order to protect the peripheral components from undesired collisions of components in case of control errors in the actuating system, the adjusting range and the drive power range are limited by a limitation of the rotational angle of one of the three shafts relative to a second shaft or relative to the housing. For this purpose, a mechanical stop made as an integral part of the device is used. In the known prior art of camshaft adjusters, this stop is arranged between the driven shaft and the drive shaft because, as a rule, the adjusting shaft traverses an angle of more than 360°.

In such a configuration, the adjusting shaft, which is not limited directly in the adjusting or drive angle, is decelerated in case of a stop through the transmission kinematics and the rigidity of the transmission components as soon as the power take-off side reaches the limit of the rotational angle. During this event, as a result of the extremely high loads, transmission components can get so strongly deformed that they collide with each other and cause the adjusting member to clamp. Moreover, the transmission components can suffer prematurely from fatigue, or they must be oversized for the normal operation to resist the high loads in case of a non-decelerated stop.

SUMMARY

The object of the invention is to design a triple shaft adjusting gear such that the action of pulsed loads occurring in the adjusting member when a stop is reached is damped.

The above object is achieved with a triple shaft adjusting gear including one or more features of the invention.

Advantageous features and developments of the invention are described below and in the claims.

The triple shaft adjusting gear comprises a driving part that can be connected rotationally fast to a drive shaft, a driven part that can be connected rotationally fast to a driven shaft and an adjusting member that can be connected to an adjusting shaft, and a mechanical stop for limiting an adjusting angle between the drive shaft and the driven shaft being arranged between two of the three said shafts. According to the invention, the stop comprises an elastic coupling member for damping an impingement in case of a stop.

The invention will be described in the following with reference to a camshaft adjuster but the invention can also be applied to other triple shaft adjusting gears and double shaft arrangements (driving part fixed on housing).

In a preferred form of embodiment of the invention, the elastic coupling member is used in an electromechanical camshaft adjuster in which the stop is arranged between the driving part and the driven part. The stop is formed on the drive side by a stop ring comprising a stop lug and on the driven side by a stop disk comprising a shift gate. Each of the shift gate and the stop lug guided in the shift gate comprise respectively at least one (in the normal case, two) stop surfaces, and these stop surfaces come into contact with each other in case of a stop. The coupling member is preferably disposed between the stop surfaces.

The advantages of the invention are to be seen particularly in the fact that an effective internal partial uncoupling of the external load can be achieved with simple constructional measures. From a particular load moment on, the elastic coupling member assures a higher yielding capacity (i.e. lower rigidity) in the force flow between the corresponding stop surfaces when the stop position has been reached. A large part of the kinetic energy of the rotating shafts (drive shaft and adjusting shaft) is thus converted into deformation energy upon impact against the stop. Due to the longer path, work is performed so that, as a result, energy of movement is quasi "destroyed". Due to the inevitable inner and outer friction, energy is likewise discharged in the form of heat.

The dimensioning of the elastic coupling member must be based on the maximum energy that is created in case of a stop. The elastic coupling member can be configured as a mechanical, pneumatic or hydraulic coupling member, or as a combination out of these. Suitable as a mechanical coupling member, for example, is an elastic bed on one or both of the stop surfaces, or a spring mechanism that can be configured either between the stop surfaces or in a rotationally elastic mounting. If, instead, the elastic coupling member is configured as a pneumatic or hydraulic coupling member, it is possible to use a pressure-loaded piston that is disposed, for instance, between the stop surfaces and is displaced in tangential direction or, with help of a ramp or a knuckle joint in radial direction.

BRIEF DESCRIPTION OF THE DRAWINGS

Preferred embodiments of the invention will be described more closely in the following with reference to the figures.

DETAILED DESCRIPTION OF THE PREFERRED EMBODIMENTS

Figure 1:
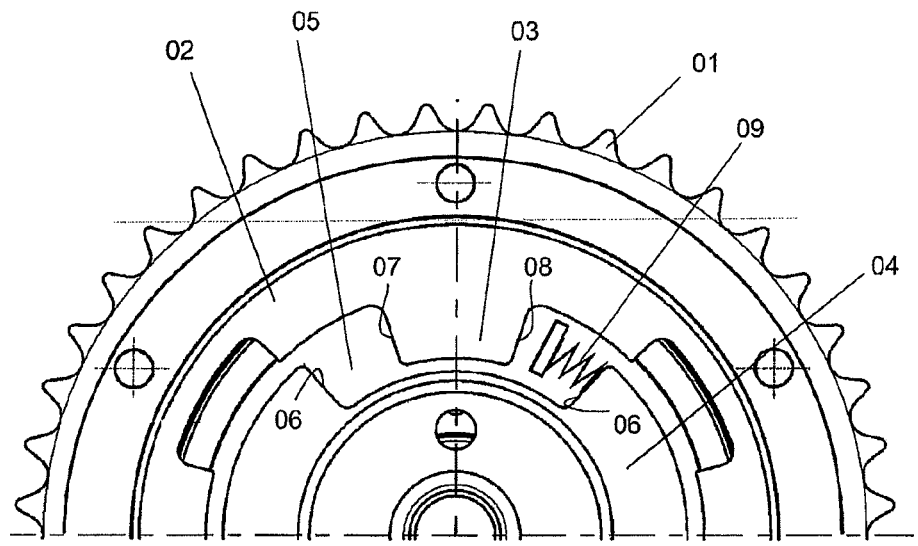
FIG. 1 shows a principle sketch of a mechanical stop of a camshaft adjuster comprising a coupling member.

FIG. 1 shows a principle sketch of a stop of an electromechanical camshaft adjuster. The driving part of the camshaft adjuster is a chain sprocket 01. The chain sprocket is operatively connected to a crankshaft through a chain (not illustrated). The chain sprocket 01 carries a stop ring 02 comprising a stop lug 03. Within the stop ring 02 is arranged a stop disk 04 that comprises a shift gate 05 and is firmly connected to a camshaft pinion (driven part). The stop lug 03 is guided in the shift gate 05 for movement relative to the stop disk. The shift gate 05 of the stop disk is limited by stop surfaces 06.

Stop surfaces in the form of an advance stop 07 and a retard stop 08 (drive side) are arranged on the stop ring 02. In cooperation with the stop surfaces 06 of the stop disk 04, these stop surfaces limit the angle of adjustment between the crankshaft and the camshaft.

In the form of embodiment illustrated, an elastic coupling member, in the present case a spring 09, is disposed on the retard stop 08. This creates a soft stop with high elasticity when the retard stop 08 is reached. The advance stop 07 is configured as a rigid stop.

Figure 2:
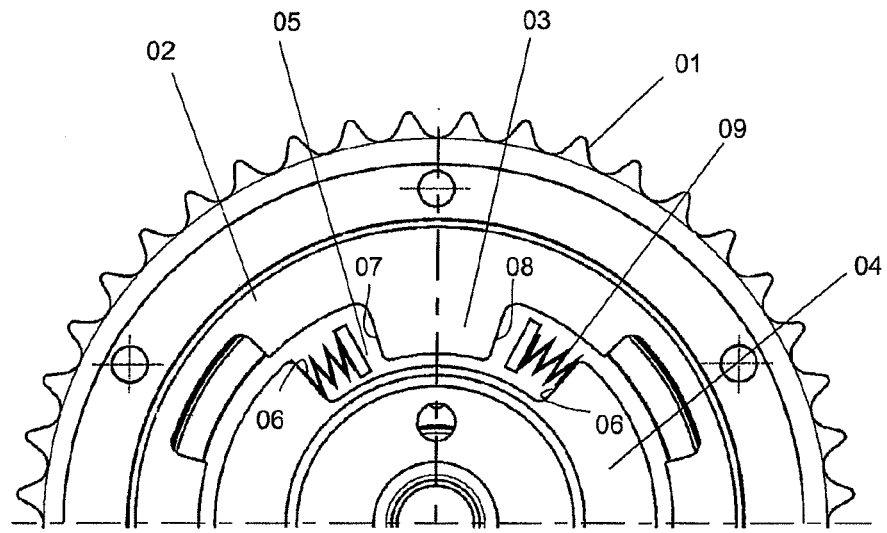
FIG. 2 shows a principle sketch of a mechanical stop of a camshaft adjuster comprising two coupling members.

The form of embodiment shown in FIG. 2 differs from the embodiment shown in FIG. 1 only by the fact that both the advance stop 07 and the retard stop 08 are configured as elastic coupling members.

Figure 3:
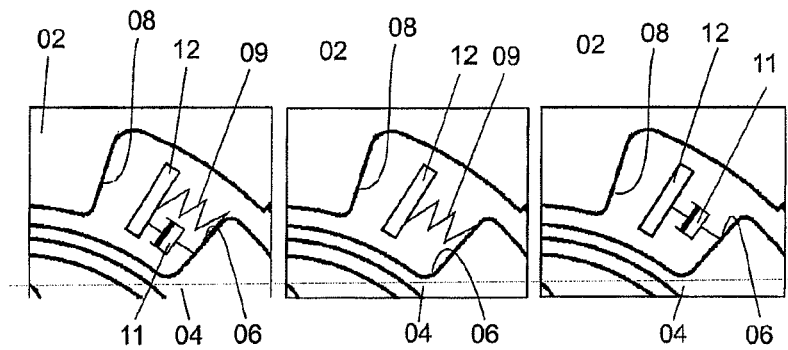
FIG. 3 shows three elementary sketches of different coupling members in a camshaft adjuster.

FIG. 3 shows detail views of three different forms of embodiment for coupling members with reference to an example of the retard stop 08, in schematic representations. The coupling members can be formed by the above-mentioned spring 09, by a hydraulic or a pneumatic piston 11 or by a combination of the spring 09 and the piston 11. The practical designing of these forms of embodiment will not confront a person in the art with any problems.

In the variants illustrated, the coupling members are all arranged in respective stop surfaces 06 of the stop disk 04 and comprise a buffer 12 which, in case of a stop, comes to abut against the retard stop 08. For a person skilled in the art, it is very simple to translate these symbolic illustrations of the coupling member into technical forms of embodiment. It is understood that these forms of embodiment can also apply to the advance stop 07 (FIGS. 1, 2).

Figure 4:
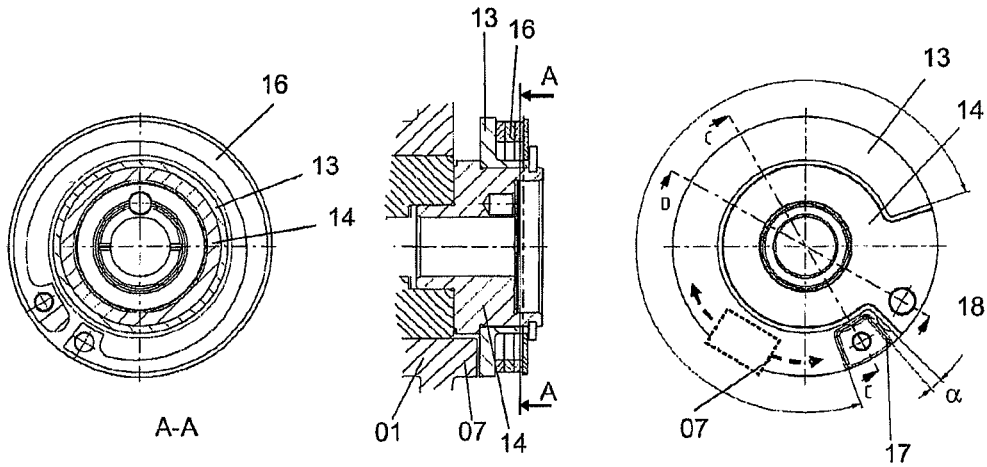
FIG. 4 shows a secondary preferred form of embodiment of a camshaft adjuster in three different views.

FIG. 4 shows a preferred form of embodiment of a triple shaft adjusting gear of the invention. In this figure, the left-hand drawing shows a longitudinal sectional view of a camshaft adjuster, the central drawing shows a cross-sectional view of the camshaft adjuster and the right-hand drawing shows a top view of the camshaft adjuster seen from the side of the camshaft.

The camshaft mounted stop disk comprises a primary stop disk 13 and a secondary stop disk 14. The secondary stop disk 14 is fixed on the camshaft in a clamping fit of a central screw (not shown). The primary stop disk 13 is mounted for rotation on the secondary stop disk 14. Torsion springs 16 bias the primary stop 17 elastically by a measure of a damping angle α against the secondary stop 18. In case of a stop, the stop surface 7 or 08 of the stop ring comes to abut at first against the primary stop 17. Depending on the energy available, said stop surface presses said stop further against the torsion springs 16 and, in doing this, loses energy. The damping properties are guaranteed until the primary stop 13 comes to abut against the secondary stop 14. This characterizes the mechanically maximum permissible end position. It is understood that the damping function can also be configured alternatively on the driven side without departing from the concept of the invention.

Figure 5:
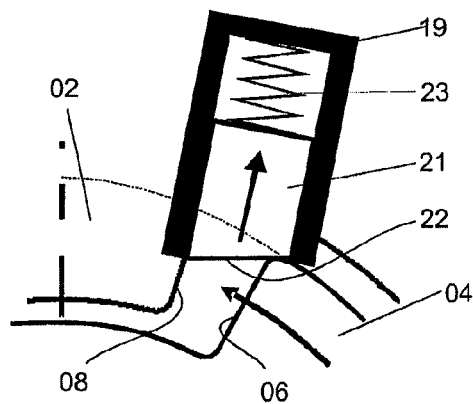
FIG. 5 shows a principle sketch of a radially displaceable piston as coupling member.

FIG. 5 shows an alternative form of embodiment of a coupling member in an elementary sketch. A radially oriented coupling member 19 is arranged on the stop lug 03. The coupling member 19 comprises a radially displaceable piston 21 that comprises a contour 22 or ramp on its inward directed end. A spring-damper element 23 damps the radial movability of the piston 21, i.e. the radial movement of the piston is damped.

When the stop surface 06 comes into contact with the stop surface 08, the stop surface 06 at first abuts against the contour 22 of the piston 21 which is thus pushed, against the action of the spring-damper element 23, in a damped manner in radial direction. In this way, the impact of the stop surface 06 against the stop surface 08 is decelerated as desired. The deceleration function can be dimensioned through the shape of the contour 22. It is understood that a hydraulic or a pneumatic coupling member may also be used in place of the spring-damper element.

Figure 6:
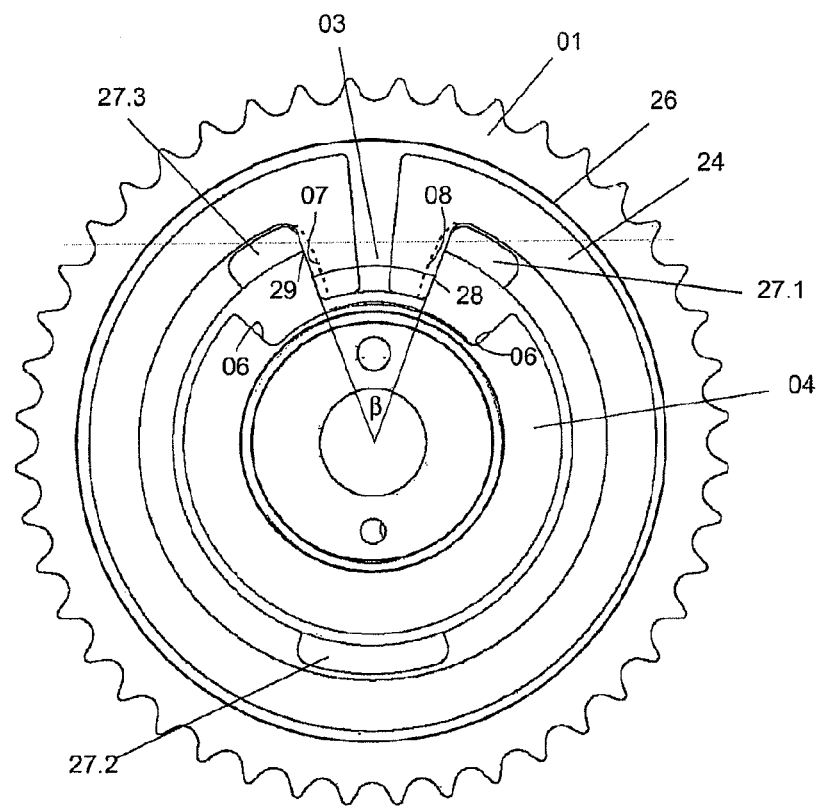
FIG. 6 shows a preferred form of embodiment of a camshaft adjuster comprising a spring washer.
Figure 7:
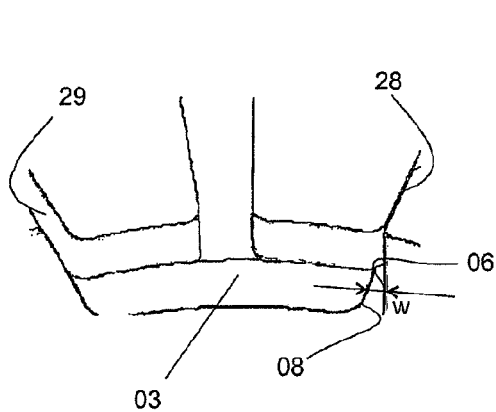
FIG. 7 shows a detail representation of the camshaft adjuster of FIG. 6.

FIG. 6 shows a particularly preferred form of embodiment of the inventive cam shaft adjuster comprising an elastic coupling member in form of a spring ring 24. The spring ring 24 is open after the manner of a circlip and comprises two radially inward directed spring ends comprising primary stop surfaces 28, 29. The angle of opening β and the spring rate of the spring ring 24 must be designed such that a damping of the stop of the stop lug is achieved through a work travel distance w (FIG. 7). The stop lug 03 with the stop surfaces 07, 08 is indicated in broken lines.

The spring ring 24 is mounted in a spring housing 26 in the chain sprocket 01 and is centered and guided through shaped elements 27.1, 27.2, 27.3 that are arranged on the chain sprocket 01. The stop surface 06 of the stop disk 04 comes to abut at first against a primary stop surface 28 of the spring ring 24. A spring torque results out of the energy of abutment and the spring rigidity and compresses the spring ring through the work travel distance of 1° to 6° depending on the design. At this stage, the spring length remains constant; the angle of opening β becomes smaller. Support of the spring torque is effected through the other end of the spring 29 in the associated shaped element 27.3. At the end of the work travel, the stop surface 06 comes to abut against the stop surface 08 of the stop lug 03 in the chain sprocket 01 and thus reaches the actual end of the displacement range.

FIG. 7 is a detail representation of the state described just above.

Figure 8:
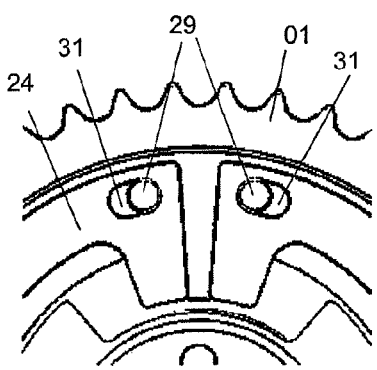
FIG. 8 shows a detail representation of the camshaft adjuster comprising modified shaped elements.

It is understood that alternative forms of embodiment and arrangements are possible as long as the described principle of work is retained. For example, FIG. 8 shows a modified arrangement of the shaped elements and of the guidance of the spring ring 24 through the pins 29 that are fixed on the chain sprocket (as shaped elements) and guided in corresponding apertures 31 of the spring ring 24.

LIST OF REFERENCE NUMERALS

01 Chain sprocket
02 Stop ring
03 Stop lug
04 Stop disk
05 Shift gate
06 Stop surface
07 Advance stop surface
08 Retard stop surface
09 Spring
10 —
11 Pneumatic piston
12 Buffer
13 Primary stop disk
14 Secondary stop disk
15 —
16 Torsion spring
17 Primary stop
18 Secondary stop
19 Coupling member
20 —
21 Piston
22 Contour
23 Spring damper element

The invention claimed is:

1. A triple shaft adjusting gear comprising a driving part that can be connected rotationally fast to a drive shaft, a driven part that can be connected rotationally fast to a driven shaft and an adjusting member that can be connected to an adjusting shaft, a mechanical stop for limiting an adjusting angle between the drive shaft and the driven shaft being arranged between two of the three shafts, said mechanical stop comprises an elastic coupling member for damping an impingement in case of a stop.

2. A triple shaft adjusting gear according to claim 1, wherein the mechanical stop is formed by a stop ring comprising a stop lug and a stop disk comprising a shift gate, said stop ring being connected rotationally fast to the drive part and said stop disk being connected rotationally fast to the driven part, and each of the stop lug and the shift gate comprises at least one stop surface and said stop surfaces come into contact with each other in case of a stop.

3. A triple shaft adjusting gear according to claim 2, wherein the elastic coupling member is arranged between the stop surfaces of the stop ring and the stop surface of the stop disk.

4. A triple shaft adjusting gear according to claim 3, wherein the elastic coupling member is at least one of a mechanical, a pneumatic, or a hydraulic coupling member.

5. A triple shaft adjusting gear according to claim 4, wherein the elastic coupling member is a spring.

6. A triple shaft adjusting gear according to claim 4, wherein the elastic coupling member is configured as a spring ring.

7. A triple shaft adjusting gear according to claim 4, wherein the pneumatic or hydraulic coupling member comprises a pressure-loaded piston.

8. A triple shaft adjusting gear according to claim 2, wherein the elastic coupling member is formed by an elastic bed on at least one of the stop surfaces.

9. A triple shaft adjusting gear according to claim 2, wherein the elastic coupling member is formed by a rotationally elastic mounting of the stop ring or of the stop disk.

10. A triple shaft adjusting gear according to claim 2, wherein the stop disk comprises a primary stop disk and a secondary stop disk, and a coupling member formed as a torsion spring is arranged between said primary stop disk and said secondary stop disk.

11. A triple shaft adjusting gear according to claim 1, wherein the coupling member possesses a damping characteristic.

* * * * *